US00RE47232E

(19) United States
(12) Reissued Patent
Walt, II et al.

(10) Patent Number: US RE47,232 E
(45) Date of Reissued Patent: Feb. 12, 2019

(54) ASSEMBLY SYSTEM FOR MONITORING PROPER FASTENING OF AN ARTICLE OF ASSEMBLY AT MORE THAN ONE LOCATION

(71) Applicant: Wildcat Licensing WI LLC, Glenview, IL (US)

(72) Inventors: Michael A. Walt, II, DeKalb, IL (US); Samuel A. Walt, DeKalb, IL (US)

(73) Assignee: WILDCAT LICENSING LLC, Glenview, IL (US)

(21) Appl. No.: 15/452,306

(22) Filed: Mar. 7, 2017

Related U.S. Patent Documents

Reissue of:

(64) Patent No.: 6,763,573
Issued: Jul. 20, 2004
Appl. No.: 09/992,326
Filed: Nov. 19, 2001

(51) Int. Cl.
*B25H 1/00* (2006.01)
*B23P 19/06* (2006.01)
*B25B 23/14* (2006.01)

(52) U.S. Cl.
CPC ..... *B23P 19/066* (2013.01); *B25B 23/14* (2013.01); *B25H 1/0021* (2013.01);
(Continued)

(58) Field of Classification Search
CPC ... B23P 19/066; B25H 1/0021; B25H 1/0028; B25B 23/14; Y10T 29/49769;
(Continued)

(56) References Cited

U.S. PATENT DOCUMENTS 1,228,997 A 5/1917 Peters et al.
3,798,731 A 3/1974 Groendyke
(Continued)

FOREIGN PATENT DOCUMENTS

DE 19609511 9/1997
EP 0178 300 1/1990
(Continued)

OTHER PUBLICATIONS

Declaration of Lawrence E. Osentoski, Jr. dated Dec. 26, 2013.
(Continued)

*Primary Examiner* — William C Doerrler
(74) *Attorney, Agent, or Firm* — Finnegan, Henderson, Farabow, Garrett & Dunner LLP

(57) ABSTRACT

A more reliable and fool-proof method and apparatus for assembling an article of assembly (e.g. with predetermined screw torque requirements) in which the article of assembly has multiple fastening locations. The method comprises holding the article of assembly fixed while providing at least two different types of targets fixed relative to the article of assembly that correspond to the individual fastening locations. Fasteners are fastened into the article of assembly at the fastening locations. When fastening is occurring at one of the fastening locations, one of the targets is being sensed. Based on the target sensed, a target output is generated that differentiates between different types of targets thereby indicating fastening location of the fastening tool. The electronic target output is used for electronic control such as for stopping a conveyor to keep the article of assembly at an assembly station until the fastening operations have been completed.

24 Claims, 8 Drawing Sheets

(52) U.S. Cl.
CPC . *B25H 1/0028* (2013.01); *G05B 2219/37459* (2013.01); *G05B 2219/37555* (2013.01); *G05B 2219/45022* (2013.01); *Y10T 29/4978* (2015.01); *Y10T 29/49719* (2015.01); *Y10T 29/49766* (2015.01); *Y10T 29/49769* (2015.01); *Y10T 29/49771* (2015.01); *Y10T 29/49947* (2015.01); *Y10T 29/5303* (2015.01); *Y10T 29/53039* (2015.01); *Y10T 29/53052* (2015.01); *Y10T 29/53074* (2015.01); *Y10T 29/53087* (2015.01); *Y10T 29/53091* (2015.01); *Y10T 29/53383* (2015.01); *Y10T 29/53417* (2015.01); *Y10T 29/53548* (2015.01)

(58) Field of Classification Search
CPC ..... Y10T 29/53087; Y10T 29/49771; Y10T 29/5303; Y10T 29/53417; Y10T 29/49947; Y10T 29/53383; Y10T 29/53074; Y10T 29/4978; Y10T 29/49719; Y10T 29/53052; Y10T 29/49766; Y10T 29/53548; Y10T 29/53039; Y10T 29/53091; G05B 2219/37459; G05B 2219/37555; G05B 2219/45022
USPC ..... 29/407.02, 407.05, 407.1, 525.01, 707, 29/712
See application file for complete search history.

(56) References Cited

U.S. PATENT DOCUMENTS

| | | | | | |
|---|---|---|---|---|---|
| 4,104,779 | A | * | 8/1978 | Sigmund | 29/407.02 |
| 4,211,120 | A | * | 7/1980 | Tambini | 73/862.23 |
| 4,611,377 | A | | 9/1986 | McCormick et al. | |
| 4,664,001 | A | | 5/1987 | Denman | |
| 4,787,136 | A | | 11/1988 | Majic | |
| 4,813,125 | A | * | 3/1989 | Dacey, Jr. | 29/714 |
| 4,987,806 | A | | 1/1991 | Lehnert | |
| 5,005,682 | A | | 4/1991 | Young et al. | |
| 5,072,506 | A | * | 12/1991 | Dacey, Jr. | 29/712 |
| 5,131,130 | A | | 7/1992 | Eshghy | |
| 5,272,805 | A | * | 12/1993 | Akeel et al. | 29/712 |
| 5,407,063 | A | | 4/1995 | Warner et al. | |
| 5,410,229 | A | | 4/1995 | Sebastian et al. | |
| 5,506,682 | A | * | 4/1996 | Pryor | 356/375 |
| 5,591,919 | A | | 1/1997 | Hathaway et al. | |
| 5,608,956 | A | * | 3/1997 | Seki | 29/701 |
| 5,637,968 | A | * | 6/1997 | Kainec et al. | 29/407.1 |
| 5,854,880 | A | * | 12/1998 | Pryor | 395/94 |
| 6,247,387 | B1 | * | 6/2001 | Ketteringham | 81/467 |
| 6,305,064 | B1 | * | 10/2001 | Watadani et al. | 29/430 |
| 6,317,953 | B1 | * | 11/2001 | Pryor | 29/407.04 |
| 6,430,463 | B1 | | 8/2002 | Lysaght | |
| 6,578,282 | B2 | | 6/2003 | Haegele et al. | |
| 6,604,279 | B2 | * | 8/2003 | Kurtz | 29/705 |
| 6,763,573 | B2 | | 7/2004 | Walt, II et al. | |
| 6,782,594 | B2 | | 8/2004 | Shoberg | |
| 6,928,332 | B2 | | 8/2005 | Gass | |
| 7,055,233 | B1 | | 6/2006 | Hofer et al. | |
| 7,062,831 | B2 | | 6/2006 | Walt, II et al. | |
| 2002/0029092 | A1 | | 3/2002 | Gass | |
| 2002/0038159 | A1 | | 3/2002 | Gass | |

FOREIGN PATENT DOCUMENTS

| | | |
|---|---|---|
| JP | H9-155753 | 6/1997 |
| WO | WO 00/17719 | 3/2000 |

OTHER PUBLICATIONS

Mistake-Proofing for Operators: The ZQC System, adapted from Shigeo Shingo, Zero Quality Control (Productivity Press, 1997) ("Shingo I").
Parent U.S Appl. No. 09/992,326, filed Nov. 19, 2001.
Office Action in U.S. Appl. No. 09/992,326, dated Aug. 29, 2003.
Response to Office Action in U.S. Appl. No. 09/992,326, dated Dec. 1, 2003.
Notice of Allowance in U.S. Appl. No. 09/992,326, dated Jan. 9, 2004.
Plaintiff Wildcat's Revise Claim Construction dated Nov. 26, 2013.
Defendant JCI's Revise Claim Construction dated Aug. 30, 2013.
American Heritage Dictionary of the English Language (Houghton Mifflin Co., 4th ed., Sep. 14, 2000).
Jeff Sabatini, "Seat Time," Automotive Manufacturing & Production, vol. 112, p. 54 (Jan. 1, 2000) American Heritage Dictionary of the English Language (Houghton Mifflin Co., 4th ed., Sep. 14, 2000) ("Sabtini").
Notice of Allowance in U.S. Appl. No. 10/789,307, dated Feb. 1, 2006.
Chilton's Auto Repair Manual, 1993-97 (Chilton 1996) ("Chilton").
Wildcat's First Amended Complaint fo Patent Infringement, filed in Case No. 3-13-cv-00328 (W.D. Wis.) on May 20, 2013.
U.S. Appl. No. 10/789,307, filed (application leading to '831 patent) Feb. 27, 2004.
Allen-Bradley Installation and Operation Manual (Allen-Bradley Company, Inc. 1996).
Shigeo Shingo, Zero Quality Control: Source Inspection and the Poka-yoke System (Productivity Press 1986) ("Shingo II").
Billibon H. Yoshimi et al., "Closed-Loop Visual Grasping and Manipulation," IEEE International Conference Robotics and Automation (1996).
K. Srinivasan, "Machine Tool Feed Drives and Their Control—A Survey of the State of the Art," Journal of Manufacturing Science and Engineering, vol. 119, Nov. 1997, pp. 743-748.
J. T. Boys, Dr. et al., "Design and Performance of an Automatic Control System for Fastener Tightening," Proc. Instn Mech Engrs vol. 191, pp. 371-381 (1977).
Johnson Controls, Inc.'s Preliminary Invalidity Contentions dated Aug. 23, 2013.
Videotaped Deposition of L. Catherine Brinson, Ph.D. dated Dec. 5, 2014.
Merriam-Webster's Collegiate Dictionary, Tenth Edition, 1998, p. 684.
Second Declaration of Mr. Lawrence E. Osentoski dated Dec. 22, 2014—831 Patent.
Second Declaration of Mr. Lawrence E. Osentoski dated Dec. 22, 2014—573 Patent.
The IEEE Standard Dictionary of Electrical and Electronics Terms, Sixth Edition, 1996.
Exhibit to Dec. 5, 2014 Deposition of Dr. L. Cate Brinson—December Diagram Illustrating First Example of Fastening Sequence.
Exhibit to Dec. 5, 2014 Deposition of Dr. L. Cate Brinson—December Diagram Illustrating Second Example of Fastening Sequence.
Exhibit to Dec. 5, 2014 Deposition of Dr. L. Cate Brinson—December Diagram Illustrating Third Example of Fastening Sequence.
Johnson Controls, Inc.'s Objections to Evidence Served With Patent Owner's Response dated Oct. 10, 2014—831.
Johnson Controls, Inc.'s Objections to Evidence Served With Patent Owner's Response dated Oct. 10, 2014—'573.
Supplemental Declaration of Dr. L. Cate Brinson dated Oct. 24, 2014—831 Patent.
Supplemental Declaration of Dr. L. Cate Brinson dated Oct. 24, 2014—573 Patent.
Deposition of Lawrence E. Osentoski, Jr. dated Jan. 26, 2015.
The Random House Dictionary of the English Language, Second Edition, 1987, p. 1556.
Webster's Third New International Dictionary of the English Language, 1986, p. 1150.
Johnson Controls, Inc.'s Second Amended Answer, Affirmative Defenses and Counterclaims dated Oct. 7, 2013.
Routledge German Technical Dictionary, vol. 1, German-English, 1996, pp. 523, 624.
Routledge German Technical Dictionary, vol. 2, English-German, 1996, pp. 118, 440.
Dictionary of Technology, English German, 5th Edition, 1985, pp. 178, 670.

(56) References Cited

OTHER PUBLICATIONS

Logic Control, uni-kl.de, www.eit.uni-kl.de/dblitz/lehr/steuerungstechnik/pdfs/LN1_WS2012.pdf (last visited Mar. 21, 2014).
Declaration of Dr. L. Cate Brinson dated Oct. 3, 2014.
Deposition of Lawrence E. Osentoski, Jr. dated Sep. 8, 2014.
Webster's Third New International Dictionary and Seven Language Dictionary, 1993, p. 1786.
Merriam-Webster's Collegiate Dictionary, Tenth Edition, 2000, p. 915.
Chart Comparison of Excerpts of '573 Petition and Osentoski Declaration (Sep. 8, 2014).
Chart Comparison of Excerpts of the '831 Petition and Osentoski Declaration (Sep. 8, 2014).
Mitchell, Ryan D. et al., Casing Distortion of GE Frame 3 Gas Turbines, Proceedings of ASME Turbo Expo 2003.
Engineering Dictionary.org, Sequence Definition, 2008, http://www.engineering-dictionary.org/sequence.
Weinstein, Eric W. "Sequence" from Wolfram MathWorld, 2014, http://mathworld.wolfram.com/Sequence.html.
Merriam-Webster Dictionary, Sequence, Oct. 2, 2014, http://www.merriam-webster.com/dictionary/sequence.
Oxford English Dictionary, predetermine, Oct. 2, 2014, http://www.oed.com/view/Entry/149829?redirectedFrom_predetermine.
Oxford English Dictionary, indicate, Oct. 3, 2014, http://www.oed.com/view/Entry/94416?redirectedFrom=indicating.
DeGarmo's Materials and Proceses in Manufacturing. 11$^{th}$ Edition, 2012, Chapter 34, Adhesive Boding, Mechanical Fastening, and Joining of Nonmetals.
Depositon of Lawrence E. Osentoski, Jr., Jan. 26, 2015.
*Ford Motor Company* v. *TMC Fuel Injection Systems, LLC*, Case IPR 2014-00272 & Case IPR2014-00273—U.S. Pat. No. 7,318,414 B2, Jun. 22, 2015.
*The Scotts Company* v. *ENCAP, LLC*Case IPR2013-00110, U.S. Pat. No. 6,209,259, Jun. 24, 2014.

* cited by examiner

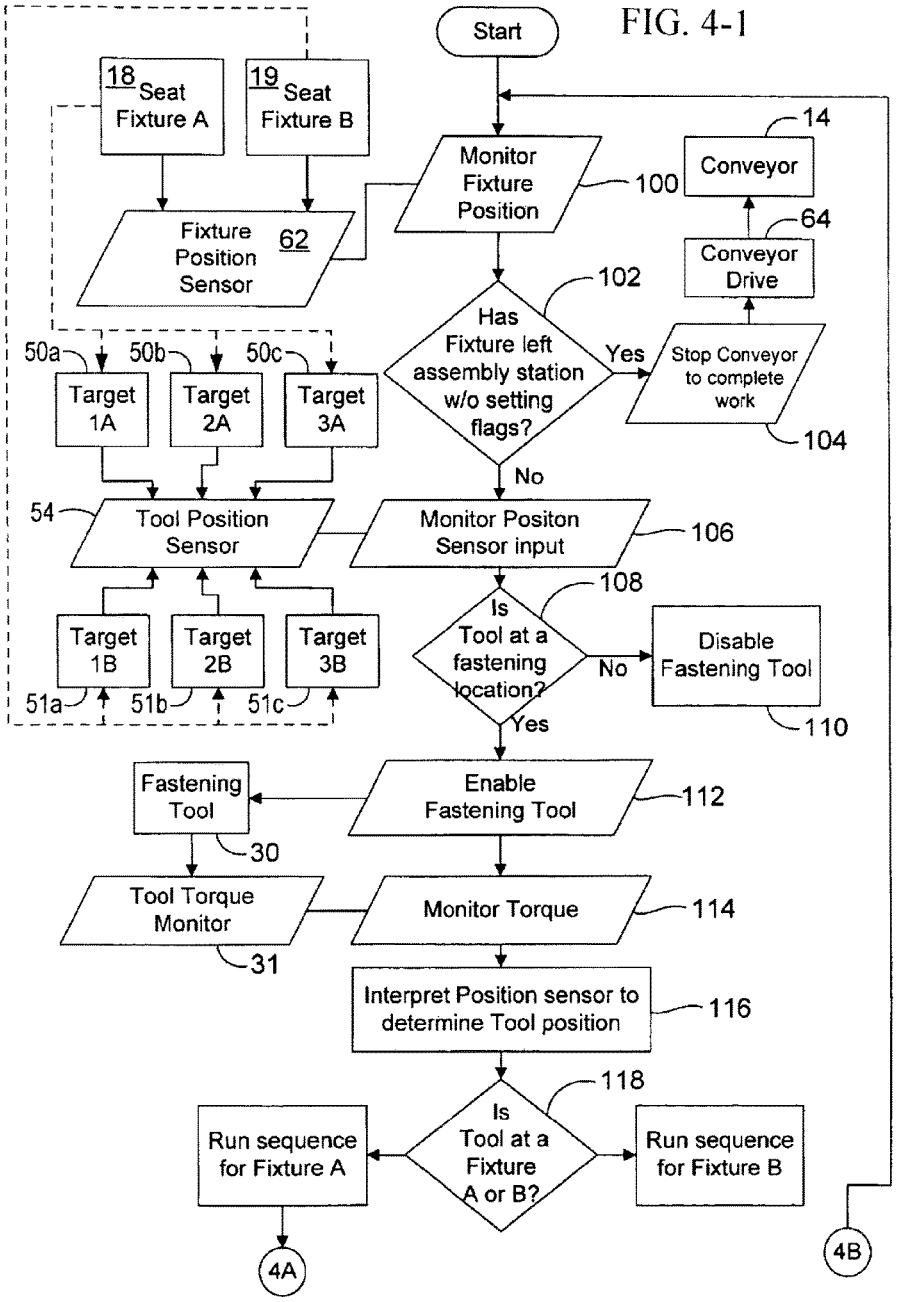
FIG. 4-1
Start
18 Seat Fixture A
19 Seat Fixture B
Fixture Position Sensor 62
Monitor Fixture Position
100
14
Conveyor
64
Conveyor Drive
102
Has Fixture left assembly station w/o setting flags?
Yes
Stop Conveyor to complete work
104
No
50a
50b
50c
Target 1A
Target 2A
Target 3A
54
Tool Position Sensor
Monitor Positon Sensor input
106
108
Is Tool at a fastening location?
No
Disable Fastening Tool
110
Yes
Target 1B
Target 2B
Target 3B
51a
51b
51c
Fastening Tool
30
Enable Fastening Tool
112
Tool Torque Monitor
31
Monitor Torque
114
Interpret Position sensor to determine Tool position
116
118
Is Tool at a Fixture A or B?
Run sequence for Fixture A
Run sequence for Fixture B
4A
4B

ASSEMBLY SYSTEM FOR MONITORING PROPER FASTENING OF AN ARTICLE OF ASSEMBLY AT MORE THAN ONE LOCATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This patent application is a reissue application of U.S. Pat. No. 6,763,573, issued Jul. 20, 2004, on application Ser. No. 09/992,326, filed Nov. 19, 2001.*

FIELD OF THE INVENTION

The present invention relates generally to assembly systems, and more particularly relates to monitoring fastening of articles of assemblies in such assembly systems.

BACKGROUND OF THE INVENTION

There are many industries where the sequence of fastening operations and/or the applied torque of fastening operations are critical in assembling an article of assembly. One such particular industry is the automotive seat assembly industry.

In the automotive seat assembly industry, if the fastening operation of screws on a seat frame is not performed correctly to fasten the parts of the seat together, then the assembled seat may be more prone to possible failure. Proper fastening of a screw may require a predetermined amount of torque to be applied to one or more screws or that the screws be fastened according to a predetermined sequence, or possibly both requirements. It is also necessary that all of the fastening locations be properly subject to a fastening operation and filled with a fastener.

A common requirement in the seat industry is that certain critical screws need to be fastened with a predetermined amount of torque. The amount of torque required for different screws among a seat can also sometimes be different. Screw torque requirements can be so critical for certain industries that monetary fines or disqualification of manufactured product can occur if certain critical screws that have not been properly fastened or torqued to the predetermined value.

In seat assembly operations, it is desirable to assemble a large volume of seats on an assembly line. In modem systems, this is typically accomplished with conveyor systems that carry seats held in fixtures through multiple assembly stations. Conveyor systems may be a continuously moving line whereby seats are worked-on and assembled as the seats are moving and traveling down the line, or as an intermittent stop and go system whereby seats are temporarily stopped at each station for assembly operations and then conveyed down the line to the next station. At the stations where seat parts are assembled with screws according to a predetermined torque, torque reaction arm drivers are used. Torque reaction arm drivers provide an indication of the amount of torque applied during a fastening operation.

To achieve high volume assembly and to keep conveyor lines short, typically several different screws are fastened by a single worker at a given assembly station along the line. For example, a common arrangement is a seat assembly station where several screws are installed into the seat requiring a predetermined applied torque of the same value. This system includes a mechanism that keeps a seat at a station until the desired number of torque values is achieved with the torque reaction arm that is equal to the number of screws being installed.

While the torque reaction arm is capable of providing an indication of driven torque, this type of system can be easily tricked or subject to failure. In particular, if the worker of the torque reaction arm drives the same screw twice he can accidentally provide two torque values for one screw. In repetitive work operations requiring several tasks at a single assembly station, workers can forget which screw has been properly fastened or otherwise make an accidental error in fastening the same screw twice. The result is that one or more screws have been improperly fastened despite the total number of torque values has been achieved for the station (thereby allowing release of the seat from the station for further downstream assembly).

Even without mistakes, some workers have been known to intentionally bypass or trick existing systems. In particular, there have been instances where a worker drives a screw, then reverses the same screw and then refastens that same screw at the same location to get more than one good output value at the same location to in effect trick the system. Workers have even been known to drive a screw mounted in a panel proximate the assembly station to intentionally bypass or trick the system. The cause of these problems is difficult to understand but it may include worker frustration or fatigue with respect to properly fastening screws into a seat.

One approach to reducing employee mistakes in fastening operations is to reduce the number of tasks performed at a given work station. However, this approach increases the length and cost of the assembly line and decreases worker efficiency. Another approach is to install quality control in the form of close supervision or downstream torque checking to ensure quality and accuracy of fastening operations. However, increased supervision also increases costs and decreases overall efficiency of an assembly line. There have even been instances where companies have discovered such fastening problems of a large scale level and have had to conduct massive quality control operations by manually checking the proper installation of fasteners and thousands of torque values on seats that have already been run through the line. This is both time consuming and costly.

BRIEF SUMMARY OF THE INVENTION

In light of the above, it is a general aim of the present invention to provide a more reliable and more fool-proof way to conduct fastening operations in assembling an article of assembly.

In that regard, it is also a further object of the present invention to provide a more efficient way of ensuring fastening operations are performed correctly on an article of assembly.

In accordance with these and other objectives, the present invention is directed towards a new more reliable method for assembling an article of assembly in which the article of assembly having multiple fastening locations in spaced apart relation. The method comprises holding the article of assembly in a fixed position while providing at least two different types of targets fixed relative to the article of assembly that correspond to the individual fastening locations. Fasteners are fastened into the article of assembly at the various fastening locations. When fastening is occurring at one of the fastening locations, one of the targets is being sensed. Based on the target sensed, an electronic target output is generated that differentiates between the different types of targets thereby indicating fastening location of the fastening tool. The electronic target output can be used for electronic control or alarm purposes.

The present invention is also directed toward an assembly system for assembling articles of assembly to implement the above method. The assembly system comprises a fixture holding the article of assembly, and first and second targets fixed relative to the fixture that correspond to first and second fastening locations on the articles of assembly. A fastening tool is adapted to fasten fasteners into the article of assembly at the first and second fastening locations with different tool positions relative to the fixture when the tool is at the different fastening locations. The assembly system further includes a target sensor fixed relative to the fastening tool along at least one axis. The target sensor senses the first and second targets when the fastening tool is fastening at the first and second locations respectively. The target sensor generates a target output differentiating between the first and second targets and thereby indicates when the fastening tool is at the first and second fastening locations.

Further aspects of the present invention relate to implementations on conveyor systems including both continuous and non-continuous or intermittent type conveyor systems.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration, a preferred embodiment of the present invention has been illustrated in FIGS. 1-4 as embodied in an assembly station 10 for assembling articles of assembly illustrated in the form of automotive seats 12. Although only one assembly station 10 is fully illustrated in FIGS. 1-3, it will be appreciated that the assembly station 10 is one of several assembly stations that are typically disposed in a predetermined sequence whereby assembly work operations are performed.

Figure 1:
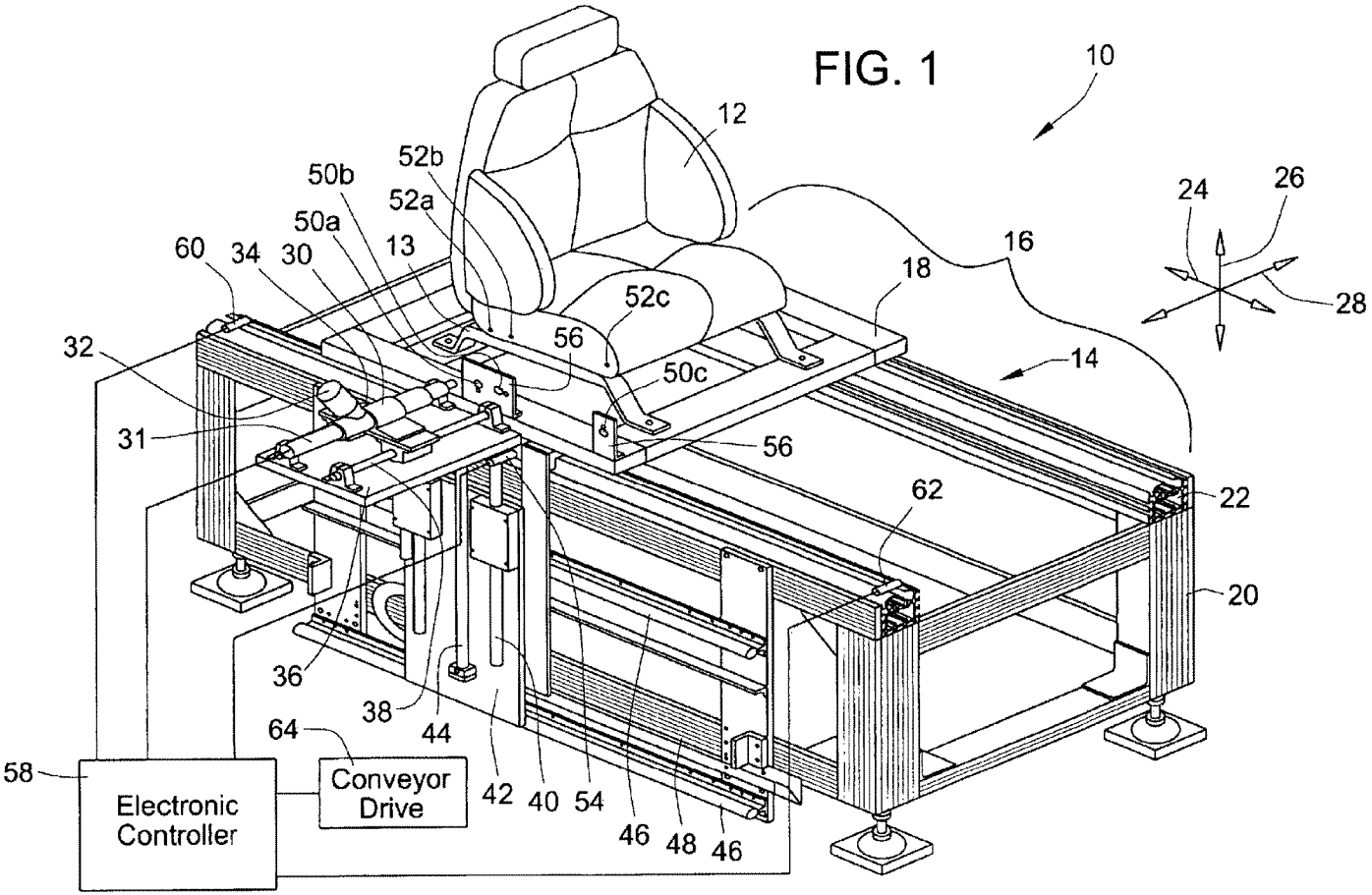
FIG. 1 is an isometric and partly schematic view of a seat assembly station according to a preferred embodiment of the present invention.
Figure 2:
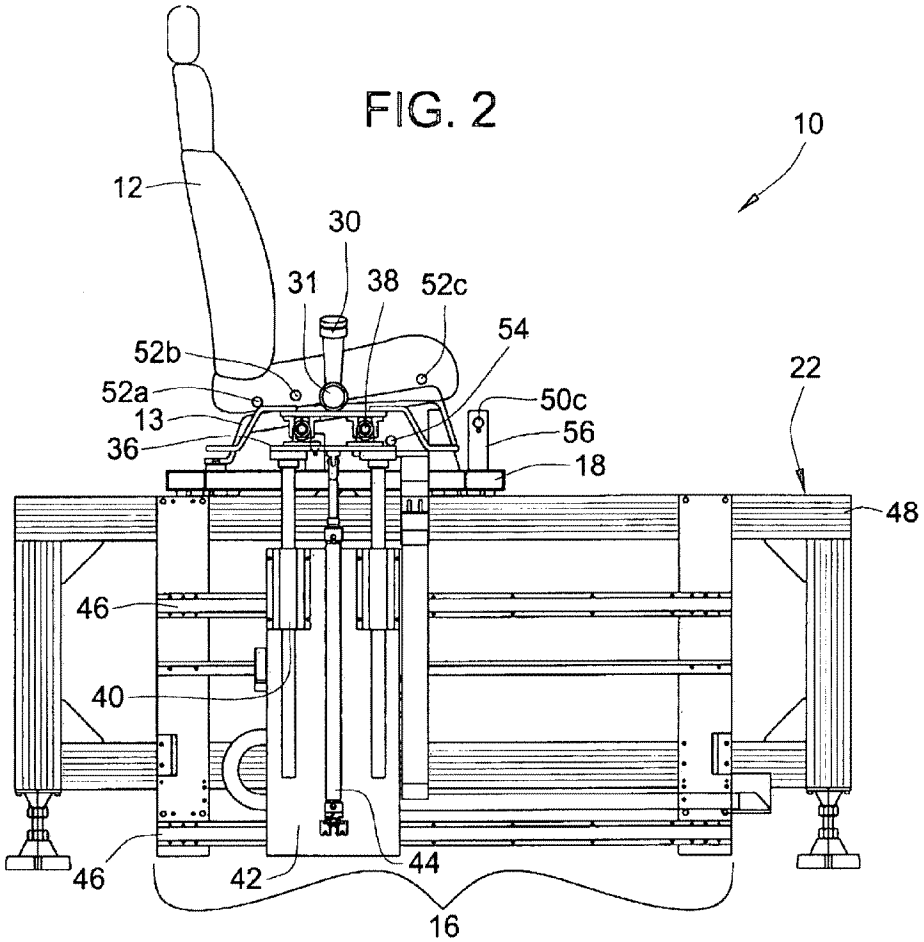
FIG. 2 is a side elevation view of the seat assembly station illustrated in FIG. 1.
Figure 3:
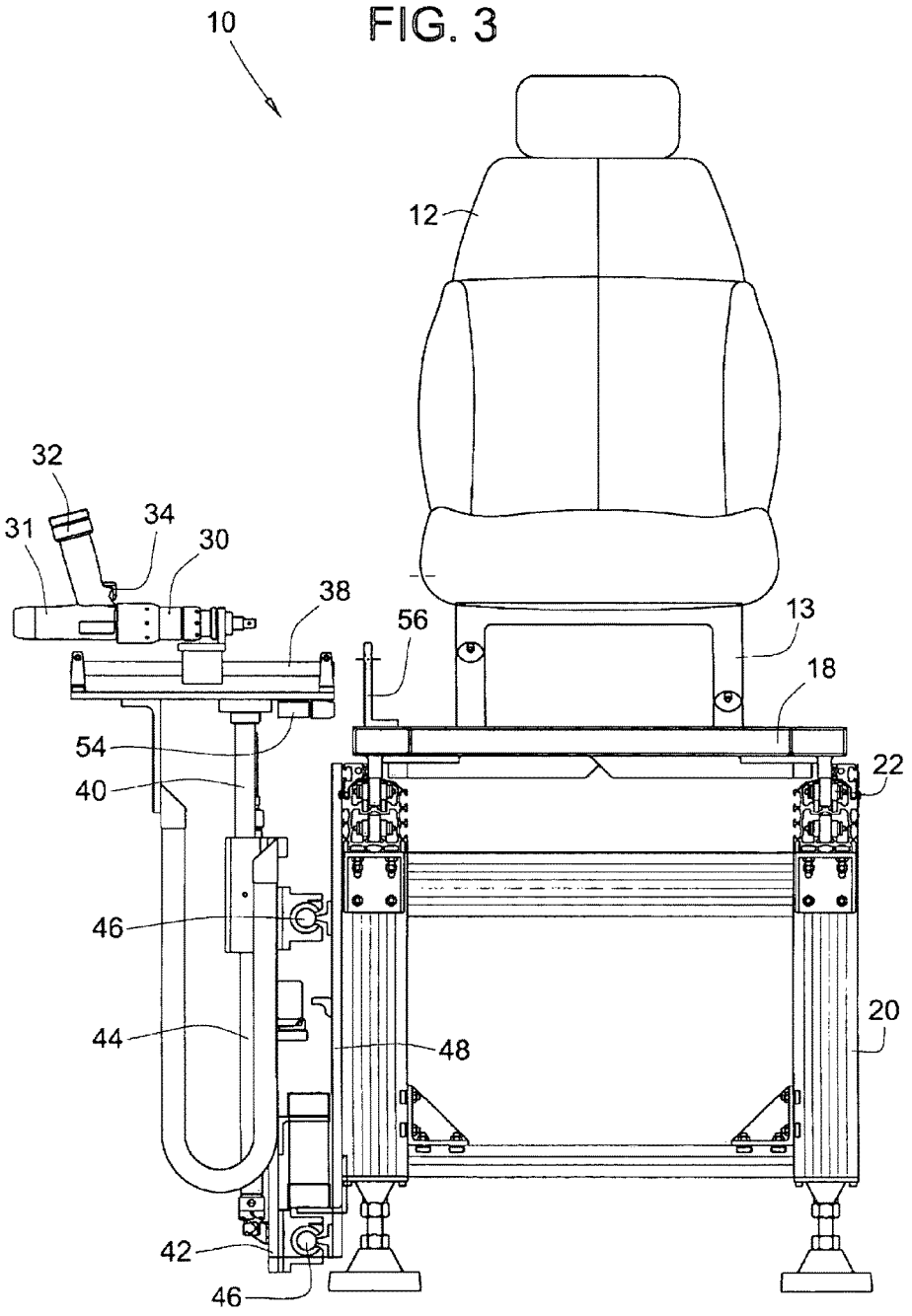
FIG. 3 is front elevation view of the seat assembly station illustrated in FIG. 1.

To transport the seats 12 through the various stations, a conveyor 14 is provided that runs through the assembly station 10. The conveyor 14 is illustrated as a continuous type in which the conveyor 14 runs and moves the seats 12 substantially continuously. In particular, the conveyor 14 will typically run on a continuous basis and continuously move the seats 12 downstream through the various stations unless the necessary work operations any of the particular stations are not performed within the allotted time given for that station, or a breakdown occurs, or other similar event occurs requiring stoppage of the conveyor 14. As can be seen in FIG. 1, the assembly station 10 has a span 16 of work area over which the work operations can be performed at the illustrated assembly station 10. The amount of time a seat 14 typically spends at an assembly station is equal to the length of the span 16 divided by the operating speed of the conveyor 14.

The conveyor 14 includes a stationary support frame 20 and a moving line 22. A plurality of seat fixtures 18 are affixed to the moving line 22 at equidistant intervals. The seat fixtures 18 clamp onto or other wise hold the seats 12 in a fixed position for assembly operations. Unassembled base frames of seats 12 are clamped into the fixtures 18 (typically through locating pins and a clamping mechanism that are not shown) at the upstream input location of the conveyor 14, while assembly seats are removed from the fixtures 18 at the downstream output location of the conveyor 14. The fixtures 18 are recycled and used over and over again for assembling seats 12.

For purposes of reference, three mutually perpendicular axes 24, 26, 28 have been shown. The axes include a horizontal axis 24 parallel to the conveyor 14, a vertical axis 26 and a tool plunging axis 28.

At the illustrated assembly station 10, a fastening tool is provided in the illustrated form of an electrically powered, torque reaction arm, screw driver 30 ("power screw driver") for driving threaded bolts, screws or other threaded fasteners into the frame 13 of the seat 12. The power screw driver 30 is manually operated including a handle 32 and a trigger 34 that provides for forward and reverse modes to correspondingly drive or remove threaded fasteners. The power screw driver 30 also comprises an integral torque monitor 31 that is capable of providing an output of the torque applied to fasteners by the power screw driver 30.

The power screw driver 30 is mounted on a horizontal tool platform 36 via a first linear rail mechanism 38 that extends the tool plunging axis 28. The first linear rail mechanism 38 allows for sliding linear movement of the driver 30 in the plunging axis 28. The horizontal tool platform 36 is in turn supported by a second linear rail mechanism 40 that extends in the vertical axis 26. The second linear rail mechanism 40 is mounted to a vertical support plate 42. The second linear rail mechanism 40 allows for sliding linear movement of the driver 30 in the vertical axis 26. A supporting recoil cylinder 44 may be used to support the horizontal platform 36 at the desired height and to counteract the force of gravity for the support assembly of the driver. The vertical support plate 42 is in turn supported by a third linear rail mechanism 46 that is mounted to an adjacent wall or side 48 of the conveyor 14. The third linear rail mechanism 46 allows for sliding linear movement of the driver 30 in the horizontal axis 26 parallel to the length of the conveyor 14 at the assembly station 10. The length of the third linear rail mechanism 46 also determines and sets the span 16 of the assembly station 10 over which fastening operations can be performed with the power screw driver 30. From the foregoing, it can be seen that the power screw driver 30 can be manipulated along the three different axes 24, 26, 28, relative to the conveyor 14 and or fixtures 18 to fasten screws into seats 12 as desired.

In accordance with the present invention, the disclosed embodiment includes a plurality of differentiated targets 50a, 50b, 50c corresponding to different fastening locations 52a, 52b, 52c on the seat 12, respectively, and a target sensor in the form of a machine vision camera 54 for sensing the targets 50a-c. The camera 54 is fixed relative to the power screw driver 30 in at least one axis, up to all three axes. For example the target sensor camera 54 may be mounted to the horizontal platform 36 and is therefore fixed relative to the power screw driver 30 in the vertical and horizontal axes 24, 26.

The individual targets 50a-c are fixed relative to the seat 12 in spaced apart relation to their respective fastening locations 52a-c on the seat 12. The spaced apart relation is substantially the same between each of the targets 50a-c and corresponding fastening locations 52a-c in terms of distance (horizontal and vertical) and angular orientation. This equidistant spacing is also substantially the same as that between the tip end of the power screw driver 30 and the machine vision camera 54. In this manner, and with the camera 54 aligned parallel to the tool plunging axis 28, the machine vision camera 54 will sense the first target 50a when the power screw driver 30 is at the first fastening location 52a, will sense the second target 50b when the power screw driver 30 is at the second fastening location 52b, and will sense the third target 50c when the power screw driver 30 is at the third fastening location 52c.

To fix the targets 50a-c relative to the fixture 18, the targets 50a-c are preferably provided on panels 56 that in turn are mounted to the each one of the fixtures 18. The targets 50a-c may also be mounted to the moving line 22 of the conveyor (since the conveyor moves at the same speed as the seats) or mounted to or integrally provided by the seats 18 themselves to provide for fixed targets relative to the seats. For intermittent stop and go systems, the targets may be fixed stationary at the assembly station such as to the stationary support frame of the conveyor because the seat is stopped in position while work operations are being performed.

As shown in FIG. 1, each of the targets 50a-c has a distinctive characteristic that is different than that of the other targets 50a-c, which allows for differentiation of the targets 50a-50c. In FIG. 1 the distinctiveness is provided through different angular orientations of a large bolt head target and a small bolt head target. The machine vision camera 54 generates an electronic output that differentiates between the different targets 50a-50c. This electronic output of the machine vision camera 54 is communicated to a processor or electronic controller 58.

The electronic controller 58 has several outputs and inputs and can utilize the electronic output from the machine vision camera 54 for a variety of purposes such as sounding an alarm, stopping the conveyor 14 and/or collecting data for analysis or quality control purposes. The actual purpose may vary between applications.

In continuous conveyor seat assembly systems where certain screw torques or fastening sequences may be critical, the electronic output from the machine vision camera 54 may be used to stop the conveyor 14 in the event that not all fastening operations are performed correctly as required, to allow further time to finish those operations at the illustrated assembly station 10. Although this can stop the entire moving line and affect other upstream or downstream stations, the disclosed embodiment ensures fool-proof assembly that ensures that proper fastening torques at each of the fastening locations 52a-c and/or fastening sequences at the fastening locations 52a-c is achieved with no further quality control required over fastening operations. In typical assembly line set ups, the conveyor line 22 will be moving at a speed that is typically sufficient to allow all work to be accomplished in the allotted time at each of the assembly stations along the conveyor.

At the illustrated assembly station 10 of FIG. 1, the electronic controller 58 has an position sensor input indicating when seats 12 enter and are about to leave the assembly station 10. This input may include a first proximity sensor 60 located near the entrance to the assembly station 10 for indicating when a seat is about to enter the station 10 and includes a second proximity sensor 62 located near the exit of the assembly station 10 for indicating when a seat is about to leave the station 10. The electronic controller 58 also has a connection to the conveyor drive 64 that is operable to stop the moving line 22 of the conveyor 14. The electronic controller 58 also has a connection to the torque reaction arm or driver 30 for activating the driver 30 when the driver 30 is in a proper fastening position and disabling the driver 30 when the driver 30 is not in a proper position to fasten at one of the fastening locations 52a-c. The electronic controller 58 also receives feedback from a torque monitor 31 integral with the driver 30 to provide an indication of the driven torque applied at a fastening location.

Figures 2, 4:
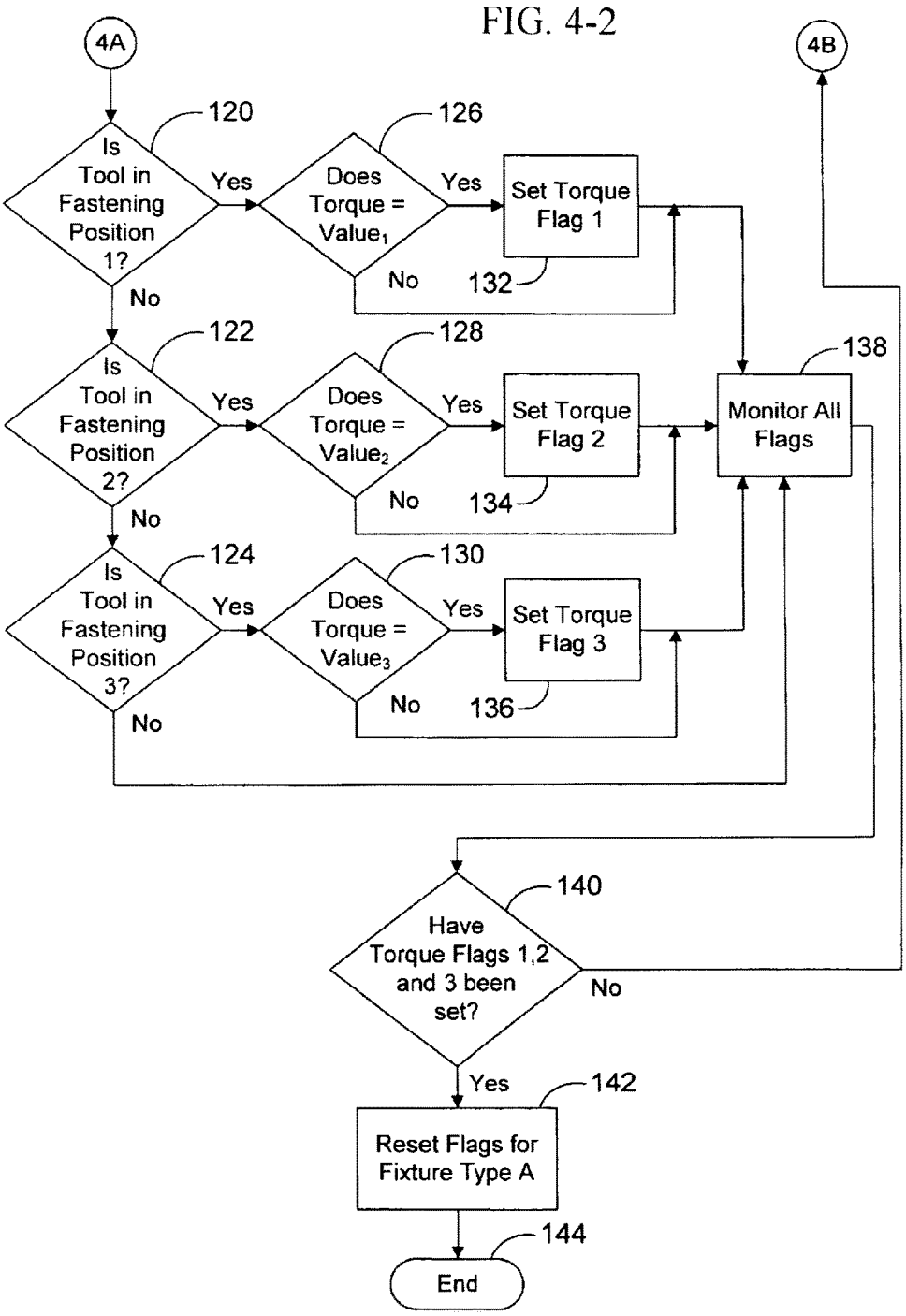
FIG. 4 is a schematic flow/control diagram for an continuous moving line conveyor type seat assembly station.

For purposes of illustration, one form of an operational electronic control diagram with a continuous conveyor system is illustrated in FIG. 4. As shown in FIG. 4 with continuing cross reference with FIG. 1, a continuous conveyor system preferably includes two different types of seat fixtures 18, 19 which hold the same seat but are differentiated by virtue of the fact that they have different types of the first, second and third targets 50a-50c, 51a-51c. In this manner, if the fixture spacing along the conveyor 14 is such that more than one fixture may be at the assembly station 10 within its span 16 at a given moment, the machine may not be tricked by moving the driver 30 from the seat of the leading fixture 18 to the seat of the trailing fixture 19 and fastening the location(s) that are missing from the seat held in the leading fixture 18.

In any event, the program is started by first monitoring fixture position 100 in response to the fixture position sensor 62 to ensure that the leading fixture 18 has not left the station 10 with a seat 12 without proper fastening at each of the three fastening locations 52a-52c. It is determined whether a fixture has left or is about to leave the assembly station without proper fastening at all three locations (e.g. setting flags as will be described) 102. If not all fastening locations have been properly fastened, then the electronic controller sends a stop signal 104 to the conveyor drive 64 to stop the conveyor 14 to ensure that all necessary fastening operations can be completed.

If, however, there is still time to conduct fastening operations, then the tool position is monitored 106 to determine whether the fastening tool or driver 30 is at a fastening location 108. If the fastening tool or driver 30 is not in position, then the fastening tool is disabled 110. If, however, the driver 30 is in position in front of one of the fastening locations as indicated by one of the six targets, then the fastening tool is enabled 112. The driver torque may then be monitored 114. The input received from the position sensor 54 is also evaluated based on the differentiating characteristics of the various targets 50a-50c, 51a-51c to determine tool position 116 and first whether the tool is servicing either fixture A 18 or fixture B 19 and then whether the tool is in the first fastening position, the second fastening position, or the third fastening position as indicated by schematic blocks 120, 122, 124. There are similar sequences run for both fixtures A and B as indicated, but only one sequence is for fixture A is shown to simplify the drawings.

As shown, once the tool fastening position is determined, then the electronic controller 58 determines whether the torque value has been reached for that position as indicated by schematic blocks 126, 128, and 130. If the torque value has been reached as previously monitored in schematic block 114, then a torque flag is set representing that fastening location as indicated in schematic blocks 132, 134, 136. Thereafter, all torque flags are monitored 138 to determine whether all three torque flags representing the three different fastening locations have been set 140. If all torque flags have been set, then the fixture is allowed to leave the station 10 and all of the flags for fixture type A are reset 142 and the system can be recycled 144. If however, not all three torque flags have been set 140, then the entire process is recycled back to the beginning and the fixture position is again sensed 100.

Figures 1, 5:
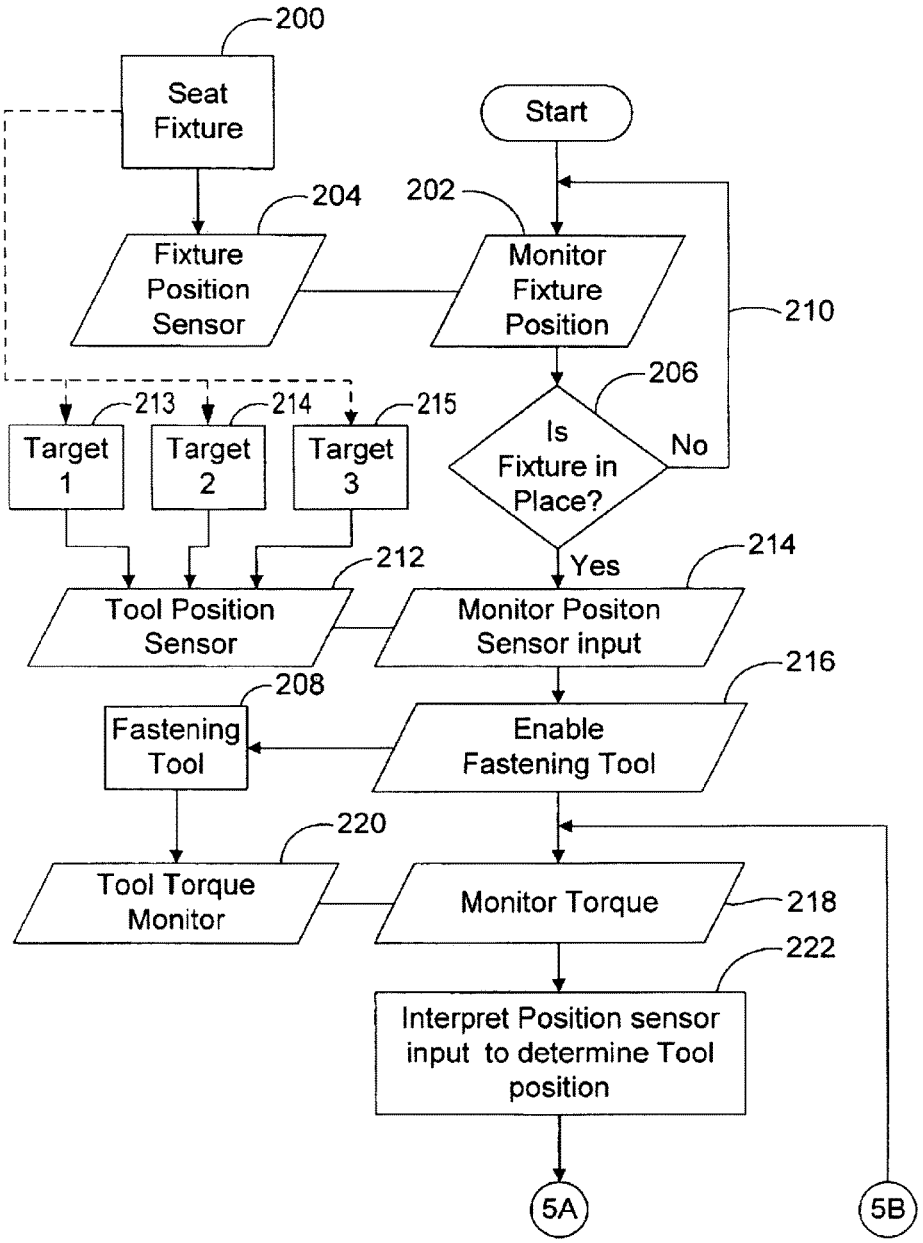
FIG. 5 is a schematic flow/control diagram for an intermittent type seat assembly station.
Figures 2, 5:
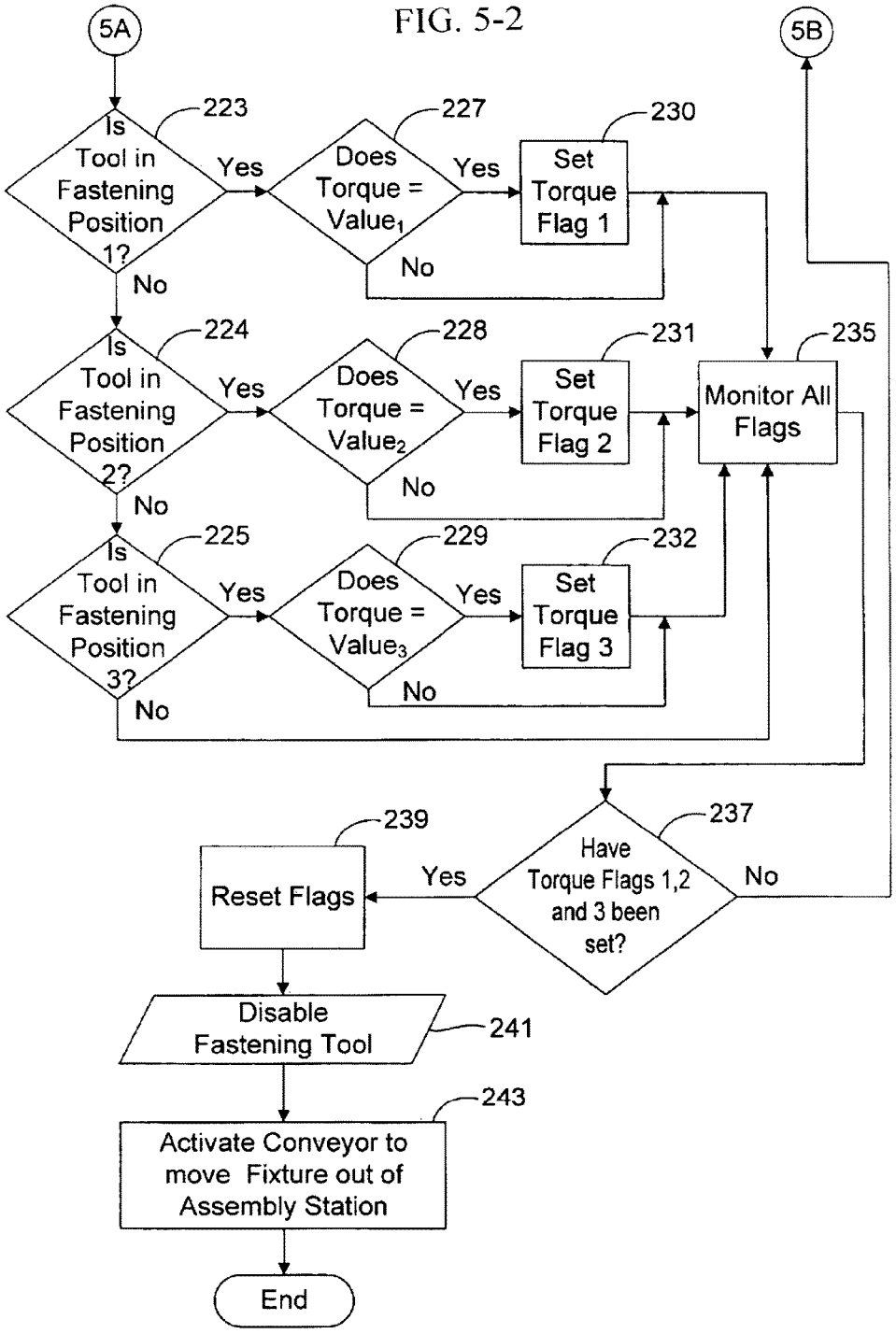

It will be appreciated that all of the operations indicated in FIG. 5 from start to end take only a fraction of a second and therefore, this cycle may be run tens or hundreds of times every second to update the torque values indicated in blocks 132, 134, and 136 on an instantaneous basis. It will also be appreciated that with the continuous type system that two different types of fixture targets need not be supplied if the fixtures 18, 19 are sufficiently spaced apart such that only one fixture occurs over the working span 16 of the assembly station 10 at any given time or that it is unlikely that a worker would switch between the seats held by leading and trailing fixtures. A further advantage of having two different types or sets of targets 50a-50c and 51a-51c is that different types of seats with different fastening requirements may be run through the station on the same continuous line if desired. Currently this is not practiced and each line is dedicated to a single model or type of seat 12. It will also be appreciated in viewing FIG. 4 that the general logic used in the electronic controller is indicated and that the exact sequence illustrated in FIG. 4 is not necessarily required. However, FIG. 4 represents the various electronic connections of the electronic controller 58 and the determinations and inputs and outputs conducted by the electronic controller 58.

Further features may also be added. For example, a further feature that can be used which is not illustrated in FIG. 4 is that once a flag is achieved for one of the given fastening locations 52a-c, the driver 30 may be disabled when it is indicated the driver 30 is in front of that position. This prevents a worker from operating the driver in reverse and removing a properly fastened bolt. The electronic controller 58 may also or alternatively have a predetermined sequence program requiring a predetermined sequence of fastening among the fastening locations 52a-c. According to this feature, the electronic controller controls the sequence of fastening based upon the target output and provides a sequence output indicating whether the predetermined sequence has been achieved. This may simply entail ensuring that the driver 30 is active only when in front of the correct one of the fastening locations 52a-c as indicated by the respective targets 50a-c.

Turning then to FIG. 5, a control and flow diagram for an intermittent conveyor system is illustrated whereby seat fixtures 200 would be stopped at the assembly station while the work operations are performed at that station and not released until all work operations have been successfully completed. According to this system, the electronic controller monitors fixture position 202 based on output from a fixture position sensor 204 which indicates whether or not the seat fixture 200 has arrived at a fixed stopped position along the intermittent conveyor system (not shown). The system determines first whether the fixture 200 is in place 206. If the fixture 200 is not in place, then the fastening tool 208 is disabled and the cycle is restarted 210. Once the fixture, however, is in place, then the output from a tool position sensor 212 is monitored 214. In particular, the tool position sensor 212 senses one of three targets 213-215 provided on the seat fixture 200. Each of these targets 213-215 has a different characteristic such that the output provided by the tool position sensor 212 has a different characteristic that can be monitored 214 by the electronic controller. Because the fixture is in place 206, the fastening tool may be enabled 216 (or alternatively enablement of the fastening tool may depend upon whether the fastening tool 208 is at a proper fastening location as indicated by the tool position sensor 212). The electronic controller then monitors torque 218 as indicated by the tool torque monitor 220 of the fastening tool 208. Based on the sensed position sensor input from the tool position sensor 212, the electronic controller can then interpret the position sensor input to determine the tool position 222 to determine whether it is positioned to fasten a fastener at one of the three fastening locations. Thereafter, depending upon whether the tool is in fastening position one, two, or three 223-225, the electronic controller will compare the monitored torque 218 to a predetermined torque value 227-229 and if appropriate set a torque flag 230-232 for the first to third fastening locations, respectfully. The electronic controller monitors all torque flags 235 to determine whether appropriate torque values for all three fastening locations has been set 237. If so, the torque flags may be reset 239 the fastening tool disabled 241 and the conveyor can be activated to move the fixture holding the seat out of the assembly station 243, and the process can be started again once a new seat and seat fixture 200 enter the assembly station. If, however, not all three torque flags have been set 237, then the process is recycled to again run through each of the steps until all three torque values have been reached as indicated by the torque flags 230-232 thereby indicating that all work operation have been properly performed and that the seat and fixture are ready for further downstream work operations if appropriate.

Figure 6:
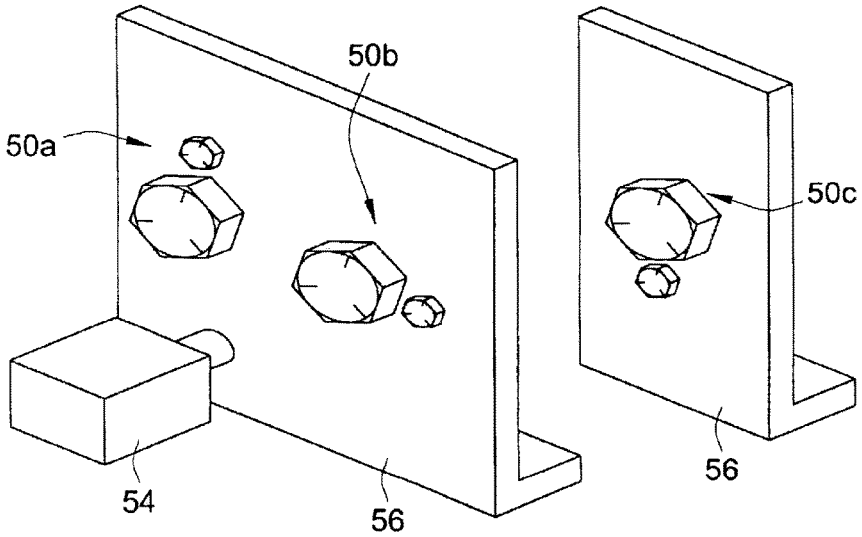
FIG. 6 is an illustration of one type of sensing system for use in an embodiment of the present invention.

The target and target sensor assembly of the system is illustrated in FIG. 6. As shown, the targets may comprise two bolts at different angular orientations among the various targets 50a, 50b, 50c. The machine vision camera 54 has an output representing the targets that can be interpreted by the electronic controller 58 and used for differentiation determinations. Although two different geometric shapes have been illustrated as the targets, it will be appreciated that the targets may be selected from the group consisting of geometric shapes, colors and alphanumeric characters.

Figure 7:
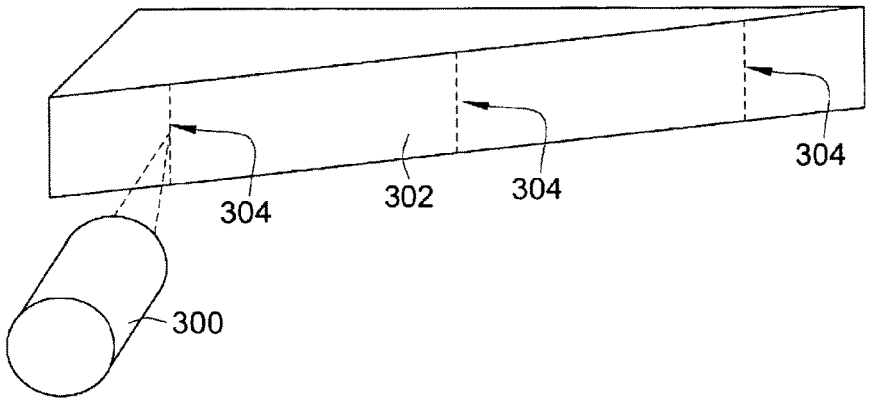
FIG. 7 is an illustration of another type of sensing system for use in an embodiment of the present invention.

A second embodiment of a sensing system is shown in FIG. 7. According to this system a laser emitter and receiver device 300 is utilized in association with reflective panel(s) which may include separate panels or a single inclined reflective panel 302 as illustrated. According to this embodiment, the individual targets 304 comprise spaced apart sections of the reflective material which are at different distances along the plunging axis relative to the emitter and receiver device 300. Because reflection and distance among the a plunging axis is critical for this embodiment, as the fastening tool plunges along a fastening axis, the laser and laser sensing device remaining stationary during plunging of the fastening tool to keep the targets 304 at the desired distance from the laser emitter and receiver device 300.

It should be noted that a minimum of two different fastening locations and targets as described above are necessary for the subject invention. It will readily be appreciated to those skilled in the art that any number of targets and fastening locations above two may be used and are specifically intended to be covered by all of the claims appended hereto.

It should also be noted that the present position monitoring system may also incorporate a sensor, linear transducer or laser to monitor the tool position to determine bolt position in the vertical axis 26. For example, bolts on the seats carried on the conveyor are always at a constant known elevation. As such, if bolts are at different elevations, and, if a fixed angle, 90 degree driver/tool is being used (rather than a tool that pivots), then sensing tool elevation provides an indication of the particular bolt being serviced. This may also be used to determine cross line or plunging travel of the tool in the plunging axis 28, and thus used to differentiate bolts spaced at different spacing in the plunging axis 28. The electronic controller 58 may use feedback from such tool position sensors to determine the fastening location being serviced in addition to the target sensing system feedback.

Although a laser sensor and machine vision camera sensor have been shown in FIGS. 6 and 7 of a preferred embodiment, it will be appreciated that other sensors and targets may also be utilized and are covered by certain claims appended hereto. For example, a bar code scanner could act as the sensor with bar codes used for targets.

The disclosed position system can also be used to set different parameters for each bolt. The parameters include run down speed, acceleration, deceleration, and the final torque target value. This is valuable because it helps to proactively prevent bad run downs which slow down the assembly process.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

[1. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location; and an electronic controller in communication with the target sensor utilizing said target output to check a quality characteristic of manual fastening operations facilitated by the fastening tool at the plurality of fastening locations, wherein the fastening tool moves independent of the electronic controller and is not controllably positioned thereby.]

[2. The assembly system of claim 1 wherein the fixture is carried by a conveyor, the fastening tool being movable relative to the conveyor.]

[3. The assembly system of claim 2 further comprising an assembly station along the conveyor, the fixture being conveyed on the conveyor to the assembly station where the fixture is intermittently stopped by a stop mechanism for fastening by the fastening tool, further comprising an electronic controller in communication with the target sensor, the electronic controller monitoring the location of the fastening tool to ensure proper fastening of fasteners at the fastening locations.]

[4. The assembly system of claim 2 further comprising an assembly station along the conveyor, the conveyor transporting the fixtures through the assembly station substantially without stopping on a continuous basis.]

[5. The assembly system of claim 4 comprising at least two types of the fixtures and at least two types of first and second targets for the at least two types of the fixtures, respectively, wherein the target sensor provides said target output that also differentiates between the at least two types of first and second targets, further comprising an electronic controller in communication with the target sensor, the electronic controller monitoring the location of the fastening tool and determining the fixture being serviced by the fastening tool to ensure proper fastening of fasteners at the fastening locations on articles of assembly held by each fixture.]

[6. The assembly system of claim 2 wherein the sensor comprises a laser and laser sensing device, the fastening tool being movable in a plane spaced from the article of assembly held in the fixture to selectively position the fastening tool at the first and second fastening locations, the laser and laser so sensing device being movable with the fastening tool in said plane, the first and second targets comprising reflective material spaced at different distances perpendicular to said plane.]

[7. The assembly system of claim 1 further comprising an electronic controller in electrical communication with the target sensor and the fastening tool, the electronic controller enabling the fastening tool when the target sensor is in sensory communication with one of the targets and disabling the fastening tool when target sensor is not in sensory communication with one of the targets.]

[8. The assembly system of claim 1 wherein the target sensor comprises a machine vision camera and wherein the first and second targets have different visual characteristics, wherein electronic controller an is in communication with the machine vision camera differentiating between the different visual characteristic to determine the location of the fastening tool.]

[9. The assembly system of claim 8 wherein the fasteners are spaced horizontally and vertically according to a predetermined spacing, the first and second targets being spaced horizontally and vertically according to the predetermined spacing, the fastening tool being movable along vertical and horizontal axes relative to the fixture.]

[10. The assembly system of claim 8 wherein the characteristics of the first and second targets are selected from the group consisting of geometric shapes, colors and alphanumeric characters.]

[11. The assembly system of claim 1 wherein the articles of assembly comprise an automotive seat comprised of at least two parts, the fasteners comprising threaded fasteners for fastening the at least two parts together.]

[12. The assembly system of claim 1, wherein the first and second targets are separate from and not part of the article of assembly.]

[13. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location;

wherein the fixture is carried by a conveyor, the fastening tool being movable relative to the conveyor, further comprising an assembly station along the conveyor, the fixture being conveyed on the conveyor to the assembly station where the fixture is intermittently stopped by a stop mechanism for fastening by the fastening tool, further comprising an electronic controller in communication with the target sensor, the electronic controller monitoring the location of the fastening tool to ensure proper fastening of fasteners at the fastening locations; and wherein the electronic controller controls the stop mechanism, the electronic controller maintaining the fixture at the assembly station and not releasing the fixture for movement on the conveyor out of the assembly station until the fastening tool has properly fastened fasteners into the article of assembly at the fastening locations.]

[14. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location;

an electronic controller in communication with the target sensor, the electronic controller monitoring the location of the fastening tool to ensure proper fastening of fasteners at the fastening locations;

wherein the fixture is carried by a conveyor, the fastening tool being movable relative to the conveyor, further comprising an assembly station along the conveyor, the fixture being conveyed on the conveyor to the assembly station where the fixture is intermittently stopped by a stop mechanism for fastening by the fastening tool; and wherein the fasteners are threaded fasteners, the fastening tool having a torque monitor, the torque monitor providing an indication to the electronic controller of torque applied to the fasteners, the electronic controller having predetermined torque values for at least one of the fastening locations, the electronic controller determining the location of the fastening tool that corresponds to the indication of torque and providing an output indicating whether the predetermined torque values for at least one of the fastening locations have been reached.]

[15. The assembly system of claim 14 wherein the electronic controller releases the stop mechanism when the predetermined torque values have been reached thereby allowing the fixture to be conveyed on the conveyor.]

[16. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location;

an electronic controller in communication with the target sensor, the electronic controller monitoring the location of the fastening tool to ensure proper fastening of fasteners at the fastening locations; and wherein the fastening tool comprises a fastening monitor indicating a fastening operation, wherein the electronic controller has a predetermined sequence program requiring a predetermined sequence of fastening among the fastening locations, the electronic controller-monitoring the sequence of fastening based upon the target output, the electronic controller providing an output indicating whether the predetermined sequence has been achieved.]

[17. The assembly system of claim 16, wherein the fixture is carried by a conveyor, the fastening tool being movable relative to the conveyor, further comprising an assembly station along the conveyor, the fixture being conveyed on the conveyor to the assembly station where the fixture is intermittently stopped by a stop mechanism for fastening by the fastening tool, wherein the electronic controller releases the stop mechanism when the predetermined sequence has been achieved thereby allowing the fixture to be conveyed on the conveyor.]

[18. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location;

where in the fixture is carried by a conveyor, the fastening tool being movable relative to the conveyor, and further comprising an assembly station along the conveyor, the conveyor transporting the fixtures through the assembly station substantially without stopping on a continuous basis; and wherein the assembly station has an input location receiving fixtures from an upstream station and an output location delivering fixtures to a downstream station, the fastening tool being movable horizontally along the conveyor between the input location and the output location, further comprising a fixture sensor in communication with fixtures passing through the assembly station, the fixture sensor having a fixture position output indicating when fixtures have exited the assembly station through the output location, an electronic controller in communication with the fixture sensor, the electronic controller outputting an alarm signal when one of the fixtures has exited the assembly station without proper fastening of fasteners at the fastening locations.]

[19. The assembly system of claim 18, wherein the fasteners are threaded fasteners, the fastening tool having a torque monitor, the torque monitor providing an indication to the electronic controller of torque applied to the fasteners, the electronic controller having predetermined torque values for at least one of the fastening locations, the electronic controller determining the location of the fastening tool that corresponds to the indication of torque and providing an output indicating whether the predetermined torque values for at least one of the fastening locations have been reached.]

[20. The assembly system of claim 19 wherein the fastening tool comprises a fastening monitor indicating a fastening operation, wherein the electronic controller has a predetermined sequence program requiring a predetermined sequence of fastening among the fastening locations, the electronic controller controlling the sequence of fastening based upon the target output, the electronic controller providing an output indicating whether the predetermined sequence has been achieved.]

[21. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristic than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location; and wherein the fasteners are threaded fasteners, the fastening tool having a torque monitor, the torque monitor providing an indication to an electronic controller of torque applied to the fasteners, the electronic controller having predetermined torque values for at least one of the fastening locations, the electronic controller determining the location of the fastening tool that corresponds to the indication of torque and providing an output indicating whether the predetermined torque values for at least one of the fastening locations have been reached.]

[22. An assembly system for assembling articles of assembly, each article of assembly having a plurality of fastening locations including at least first and second fastening locations in spaced apart relation, comprising:

a fixture holding the article of assembly;

a plurality of targets including at least a first target fixed relative to the fixture, corresponding to the first fastening location, and a second target fixed relative to the fixture, the second target corresponding to the second fastening location, the second target having a different characteristics than the first target;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

a target sensor fixed relative to the fastening tool along at least one axis, the target sensor sensing the first target when the fastening tool is in the first position, the target sensor sensing the second target when the fastening tool is in the second position, the target sensor providing a target output differentiating between the first and second targets and indicating when the fastening tool is in either of the first fastening location and the second fastening location; and wherein the fastening tool plunges along a fastening axis perpendicular to said plane, the laser and laser sensing device remaining stationary during plunging of the fastening tool.]

[23. The assembly system of claim 22 wherein the fixture is carried by a conveyor, the fastening tool being movable horizontally relative to the conveyor, the laser and laser sensing device being restricted to horizontal movement along a horizontal axis along with the fastening tool, further comprising a reflective panel extending in the horizontal axis in reflective communication with the laser and laser sensing device with a reflective surface aligned at an oblique angle relative to said plane.]

[24. An assembly system for assembling articles of assembly, each article of assembly having a plurality of fastening locations including at least first and second fastening locations in spaced apart relation, comprising:

a fixture holding the article of assembly;

a fastening tool adapted to fasten fasteners into the article of assembly at the first and second fastening locations, the fastening tool having a first position relative to the fixture in which the fastening tool is in position to fasten a fastener at the first location, and a second position relative to the fixture in which the fastening tool is in position to fasten a fastener at the second location;

at least one sensor providing a sensor output indicating when the fastening tool is the first and second fastening locations;

an electronic controller in communication with the at least one sensor, the electronic controller monitoring the location of the fastening tool to ensure proper fastening of fasteners at the fastening locations; and wherein the fastening tool comprises a fastening monitor indicating a fastening operation, wherein the electronic controller has a predetermined sequence program requiring a predetermined sequence of fastening among the fastening locations, the electronic controller monitoring the sequence of fastening based upon the sensor output, the electronic controller providing an output indicating whether the predetermined sequence has been achieved.]

[25. The assembly system of claim 1 wherein the fixture is carried by a conveyor, the fastening tool being movable relative to the conveyor, further comprising an assembly station along the conveyor, the fixture being conveyed on the conveyor to the assembly station where the fixture is intermittently stopped by a stop mechanism for fastening by the fastening tool, wherein the electronic controller releases the stop mechanism when the predetermined sequence has been achieved thereby allowing the fixture to be conveyed on the conveyor.]

*26. An assembly system for assembling components of an article of assembly, comprising:*

*first and second physically separate components that, when assembled together, form at least a portion of the article of assembly, wherein*

*(a) a single set of discrete portions of the first and second components, when placed together, form at least a single process site consisting of a plurality of fastening locations within the single process site including at least first and second fastening locations,*

*(b) each of the first and second fastening locations consists of a single opening for receiving a single fastener that, when fastened in the single opening, partially assembles the first and second components together, and*

*(c) wherein the article of assembly is structurally designed so that the first and second fastening locations are positioned within the single process site is spaced apart relation to each other such that a fastener must be inserted in the first fastening location before a fastener is inserted in the second fastening location to reduce the risk of structural failure of the assembled combination of the first and second components that would arise if a fastener were inserted in the second fastening location before a fastener were inserted in the first fastening location;*

*a fixture holding the first and second components of the article of assembly in a predetermined position in*

*which the first and second components are placed together to form the single process site;*

*a fastening tool adapted to fasten fasteners into the single process site formed by the first and second components of the article of assembly, the fastening tool having a first position relative to the fixture in which the fastening tool is in position to fasten a fastener at the first fastening location, and a second position relative to the fixture in which the fastening tool is in position to fasten a fastener at the second fastening location;*

*at least one sensor providing a sensor output indicating when the fastening tool is at the first and second fastening locations;*

*an electronic controller in communication with the at least one sensor, the electronic controller monitoring the location of the fastening tool to ensure proper fastening of fasteners at the fastening locations and having stored in a memory thereof before an operator has commenced manual fastening using the fastening tool*

*(a) data representative of the location of the first fastening location within the single process site together with first order data indicating that a fastener must be inserted in the first fastening location at a point in time before a fastener is inserted in the second fastening location, and*

*(b) data representative of the location of the second fastening location within the single process site together with second order data indicating that a fastener must be inserted in the second fastening location at a point in time after a fastener has been inserted in the first fastening location,*

*wherein the location data and the first and second order data for the first and second fastening locations form a predetermined fastening sequence for the single process site that must be followed in order for the first and second components to be assembled together in a manner that reduces the risk of structural failure of the assembled combination that would arise if a fastener were inserted in the second fastening location before a fastener were inserted in the first fastening location;*

*wherein the fastening tool comprises a fastening monitor indicating a fastening operation,*

*wherein the electronic controller has a predetermined sequence program that, when executed, requires the operator's use of the fastening tool to conform to the predetermined sequence of fastening among the first and second fastening locations by the electronic controller*

*(a) monitoring the sequence of fastening based upon the sensor output,*

*(b) electronically comparing the sensed position of the fastening tool with the data representative of the location of the first and second fastening locations within the single process site to determine if the fastening tool is located in operative relation to one of the first and second fastening locations and then*

*(c) using the order data associated with the one of the first and second fastening locations to*

*(i) enable the fastening tool, when it is positioned in operative relation to the first fastening location, to insert a fastener in the first fastening location only if the operator has not inserted a fastener in the second fastening location, and*

*(ii) enable the fastening tool, when it is positioned in operative relation to the second fastening location, only if the operator already has inserted a fastener in the first fastening location,*

*wherein requiring that the operator's use of the fastening tool conform to the predetermined sequence of fastening in the single process site reduces the risk of structural failure of the assembled combination that would arise if a fastener were inserted in the second fastening location before a fastener were inserted in the first fastening location;*

*the electronic controller providing a sequence output indicating whether the predetermined fastening sequence has been achieved each time that the operator attempts to fasten a fastener in one of the first and second fastening locations;*

*wherein the electronic controller also has stored in its memory first and second predetermined torque values that represent torque values that the operator is supposed to apply to fasteners inserted in the first and second fastening locations only when the operator's use of the fastening tool conforms to the predetermined sequence of fastening; and*

*wherein the execution of the predetermined sequence program by the electronic controller requires the predetermined sequence of fastening to be followed in the single process site and also*

*(a) uses the fastening monitor to measure torque applied to a fastener as it is being inserted in the first fastening location and then compares the measured torque to the first predetermined torque value,*

*(b) requires that the torque applied to the fastener located in the first fastening location equal the first predetermined torque value before the operator is allowed to insert a fastener in the second fastening location, which reduces the risk of structural failure of the assembled combination that would result if the operator were allowed to insert a fastener in the second fastening location when the torque applied to the first fastener does not equal the first predetermined torque value;*

*(c) uses the fastening monitor to measure torque applied to a fastener as it is being inserted in the second fastening location and then compares the measured torque to the second predetermined torque value, and*

*(d) requires that the torque applied to the fastener located in the second fastening location equal the second predetermined torque value after the first fastener has been inserted in the first fastening location at the first predetermined torque value, which reduces the risk of structural failure of the assembled combination that would result if the operator were allowed to complete assembly of the first and second components when the torque applied to the fastener inserted in the second fastening location did not equal the second predetermined torque value.*

*27. The assembly system of claim 26, wherein the fastening tool forms a part of an assembly station, the electronic controller requiring the first and second components to remain in the assembly station until after it is verified that (a) the operator's use of the fastening tool conformed to the predetermined sequence of fastening for the single process site, and (b) torque values equal to the first and second predetermined torque values were applied to fasteners located in the first and second fastening locations when the operator's use of the fastening tool conformed to the predetermined sequence of fastening for the single process site.*

*28. The assembly system of claim 27, wherein the electronic controller produces an alarm simultaneously with when an attempt is made to remove the first and second components from the assembly station before it is verified that (a) the operator's use of the fastening tool conforms to the predetermined sequence of fastening for the single process site, and (b) torque values equal to the first and second predetermined torque values were applied to fasteners located in the first and second fastening locations when the operator's use of the fastening tool conformed to the predetermined sequence of fastening for the single process site.*

*29. The assembly system of claim 28 wherein the assembly system further comprises a stop mechanism that requires the first and second components to remain in the assembly station.*

*30. The assembly system of claim 29, wherein the stop mechanism prevents removal of the first and second components from the assembly station.*

*31. The assembly system of claim 30, wherein the fixture is carried by a conveyor into and out of the assembly station the movement of which is stopped by the stop mechanism.*

*32. The assembly system of claim 31, wherein the conveyor comprises an intermittent conveyor.*

*33. The assembly system of claim 31, wherein the conveyor comprises a continuous conveyor.*

*34. The assembly system of claim 26, wherein the first and second components comprise components of a vehicle seat.*

*35. The assembly system of claim 26, wherein the article of assembly comprises a vehicle seat.*

*36. The assembly system of claim 26, wherein the assembly station forms a part of a conveyor line.*

*37. The assembly system of claim 36, wherein the conveyor comprises an intermittent conveyor.*

*38. The assembly system of claim 36, wherein the conveyor comprises a continuous conveyor.*

*39. The assembly system of claim 26, wherein the electronic controller, when executing the predetermined sequence program, disables the fastening tool when it is not in either the first or second positions.*

*40. The assembly system of claim 26, wherein the at least one sensor comprises first and second targets arranged in relation to the first and second fastening locations, the first and second targets being sensed when said fastening is occurring at the first and second fastening locations, respectively, and wherein the electronic controller is adapted to generate an electronic target output based upon said sensing that differentiates between the first and second targets thereby indicating when the fastening tool is in either of the first and second fastening locations.*

*41. The assembly system of claim 26, wherein each fastener consists of a threaded fastener.*

*42. The assembly system of claim 26, wherein the article of assembly includes an unassembled base frame.*

*43. The assembly system of claim 42, wherein the unassembled based frame is clamped into the fixture.*

*44. The assembly system of claim 43, wherein the fixture and unasssembled based frame are provided by means of a continuous moving line conveyor.*

*45. The assembly system of claim 43, wherein the fixture and unassembled base frame are provided by means of an intermittent conveyor line.*

*46. The assembly system of claim 26, wherein the single process site includes a third fastening location that consists of a single opening for receiving a single fastener.*

*47. The assembly system of claim 46, wherein the predetermined sequence of fastening is of all of the first, second, and third fastening locations such that a fastener must be inserted in the first fastening location before a fastener is inserted in the second or third fastening locations.*

*48. The assembly system of claim 26, wherein the electronic controller, when executing the predetermined sequence program, requires that the operator's use of the fastening tool conforms to the predetermined sequence of fastening of the first and second fastening locations and disables the fastening tool from performing a fastening operation when it is located at the first fastening location if the operator already has applied a first fastener in the first fastening location with a torque that equals the first predetermined torque.*

*49. The assembly system of claim 28, wherein the alarm is sounded as a result of the attempt to remove the first and second components from the assembly station.*

* * * * *